(12) United States Patent  (10) Patent No.: US 9,332,141 B2
Eguchi  (45) Date of Patent: May 3, 2016

(54) IMAGE PROCESSING APPARATUS, METHOD OF CONTROLLING THE SAME AND STORAGE MEDIUM THEREOF

(71) Applicant: CANON KABUSHIKI KAISHA, Tokyo (JP)

(72) Inventor: Kimimori Eguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/943,056

(22) Filed: Jul. 16, 2013

(65) Prior Publication Data

US 2014/0055814 A1   Feb. 27, 2014

(30) Foreign Application Priority Data

Aug. 23, 2012 (JP) ................................. 2012-184573

(51) Int. Cl.
```
G06F 3/12      (2006.01)
G06K 15/00     (2006.01)
G06F 3/00      (2006.01)
H04N 1/00      (2006.01)
```

(52) U.S. Cl.
CPC .......... *H04N 1/00405* (2013.01); *G06F 3/1207* (2013.01); *G06F 3/1259* (2013.01); *G06F 3/1287* (2013.01); *G06F 3/1288* (2013.01); *G06F 3/1293* (2013.01); *G06F 3/1222* (2013.01); *G06F 3/1238* (2013.01); *G06F 3/1265* (2013.01); *G06F 3/1267* (2013.01)

(58) Field of Classification Search
CPC .... G06F 3/1237; G06F 3/1238; G06F 3/1285
See application file for complete search history.

(56) References Cited

U.S. PATENT DOCUMENTS

| | | | |
|---|---|---|---|
| 2012/0044524 A1* | 2/2012 | Kong | 358/1.15 |
| 2012/0154854 A1* | 6/2012 | Sato | 358/1.15 |
| 2013/0321831 A1* | 12/2013 | Srinivasmurthy et al. | 358/1.13 |

FOREIGN PATENT DOCUMENTS

JP   2004-195845 A   7/2004

* cited by examiner

*Primary Examiner* — Thomas Lett
(74) *Attorney, Agent, or Firm* — Fitzpatrick, Cella, Harper & Scinto

(57) ABSTRACT

An image processing apparatus capable of communicating with a server that provides a microblogging function detects a registration of a first message to the server, acquires image data indicated by the first message whose registration is detected, outputs the acquired image data and registers to the server a second message on the first message registered to the server, in a case where the image data is not output within a predetermined time period.

11 Claims, 12 Drawing Sheets

CLOUD SERVICE SERVER
131

120
INTERNET

110
LAN

101
IMAGE FORMING APPARATUS

102
TERMINAL

FIG. 12

| PRINT ID | PRINT NAME | USER ID |
|---|---|---|
| 0001 | PROJECT_Y-DISTRIBUTION_DOCUMENT_Ver01 | 15304 |
| 0002 | PROJECT_Y-RESOURCE_MANAGEMENT | 91024 |
| 0003 | PROJECT_Y-SCHEDULE_MANAGEMENT | 32425 |
| 0004 | MINUTES_0315 | 12534 |

FIG. 13A

| COMMAND CHARACTER STRING | PROCESSING FUNCTION |
|---|---|
| SEND | SEND FUNCTION |
| PRINT | PRINT FUNCTION |
| COPY | COPY FUNCTION |
| SEND COMPLETION | SEND FUNCTION COMPLETION |
| PRINT COMPLETION | PRINT FUNCTION COMPLETION |
| COPY COMPLETION | COPY FUNCTION COMPLETION |
| SEND CANCEL | SEND FUNCTION CANCEL |
| PRINT CANCEL | PRINT FUNCTION CANCEL |
| COPY CANCEL | COPY FUNCTION CANCEL |
| ACQUIRE PRINT MATERIAL | FORGOT ACQUISITION NOTIFICATION END |

FIG. 13B

| PARAMETER CHARACTER STRING | PROCESSING FUNCTION |
|---|---|
| COPIES | COPIES PROCESSING |
| BLACK AND WHITE | BLACK AND WHITE PROCESSING |
| COLOR | COLOR PROCESSING |
| FILE | ACQUIRE FROM STORAGE DESTINATION |

IMAGE PROCESSING APPARATUS, METHOD OF CONTROLLING THE SAME AND STORAGE MEDIUM THEREOF

BACKGROUND OF THE INVENTION

1. Field of the Invention

The present invention relates to a technique in which a microblogging function provided by a service providing server is used by communicating with the server via a network.

2. Description of the Related Art

In recent years, there are services that provide a microblogging function as a communication tool. This microblogging function is a type of blog function by which a user holding an account posts short messages called "microposts" as "messages" or "comments" to the service. Here the user may include, for example, an image forming apparatus itself, a linking service, an object on a cloud service or an application, and is not limited to an actual user (human). A unique identifier is assigned to each "message" and "comment" that a user posts or transmits. In the microblogging function, communication is carried out via a "timeline" and "following". Here the "timeline" is a user specific Web page that registers, displays and manages, as a list, "comments" related to a registered "message", when a user registers a "message". Here, the user that registered the "message" and other users perform communication by exchanging information by registering information related to the message as "comments" on the "timeline".

Also, "following" is registering with another user so as to be able to display on one's own Web page a message posted by the other user.

Amongst CRM (Customer Relationship Management) services provided as cloud services, there are examples in which a microblogging function to be used as a communication tool during work is provided. In these cloud services, client information, business discussion information, etcetera are linked to messages in order to further improve the user's convenience of use. Furthermore, at the same time, in CRM services, file sharing functions are provided in which files are shared between users, wherein the files can be saved, edited, updated, and referenced. An example of this is Chatter provided by Salesforce.com as a microblogging function. Document, File, and the like are examples of file sharing functions.

Moreover, there are times when a user requests a print, but forgets to go to take the printed sheets. In order to solve such a problem, a technique in which identification information that specifies a print job is embedded in printed sheets, and it is determined whether anyone came to take a printed sheet by reading the identification information with an identification detection unit. A user that dispatched a print job is notified by an e-mail of having forgotten to take the sheet (see Japanese Patent Laid-Open No. 2004-195845). However, because there is no guarantee that the user that dispatched the print job is constantly checking his or her mail, there is no guarantee with the conventional technique that the user will definitely notice that taking the sheets was forgotten.

Also, in a case where after receiving the mail, the user received many other e-mails, it is possible that the user might forget about the e-mail that notified that taking the sheet was forgotten. There is a technique in which a print job requested by a user is only executed, and printed on a printer, when the user performs authentication on the printer. In this kind of case, a situation in which the user that dispatched a print job forgets to take the printed sheet becomes is less likely to occur. However, the user may get distracted by other things after dispatching the print job and forget that he or she dispatched the print job, and the printing for the print job will not be performed.

SUMMARY OF THE INVENTION

An aspect of the present invention is to eliminate the above-mentioned problems with the conventional technology. A feature of the present invention is to provide a technique in which in a case where a user forgets to take print material after the user requested a print, the user can be notified that he or she forgot to take the print material.

According to an aspect of the present invention, there is provided an image processing apparatus capable of communicating with a server that provides a microblogging function. The image processing apparatus comprises a detecting unit configured to detect a registration of a first message to the server, an acquiring unit configured to acquire image data indicated by the first message whose registration is detected by the detecting unit, an output unit configured to output the image data acquired by the acquiring unit and a registration unit configured to register to the server a second message on the first message registered to the server in a case where the output unit does not output the image data within a predetermined time period.

Further features and aspects of the present invention will become apparent from the following description of exemplary embodiments, with reference to the attached drawings.

BRIEF DESCRIPTION OF THE DRAWINGS

FIG. 12 is a view for explaining a print data management table for managing print data stored in a print data DB according to the first embodiment.

FIG. 13A is a view for illustrating an example of a command character string management table.

FIG. 13B is a view for illustrating an example of a parameter character string management table.

DESCRIPTION OF THE EMBODIMENTS

Embodiments of the present invention will be described hereinafter in detail, with reference to the accompanying drawings. Note that the following embodiments are not intended to limit the claims of the present invention, and that not all of the combinations of the aspects that are described according to the following embodiments are necessarily required with respect to the solution means of the present invention.

[First Embodiment]

In the first embodiment, when a user goes to the location of an image forming apparatus 101 upon which the user wishes to print, and performs user authentication, the image forming apparatus 101 follows the user and monitors for messages and comments that the user made using a microblogging function. When the image forming apparatus 101 receives an authentication of the user, the image forming apparatus 101 acquires print data that the user registered from a server providing a microblogging function and prints that print data. However, when the user makes a print request but forgets to take the print material, the image forming apparatus 101 monitors for messages and comments of the user. Explanation will be given for a case where the image forming apparatus 101 then notifies the user with a message or a comment that the user has forgotten to take the print material when the user posts a message or a comment. Note, here it is assumed that the image forming apparatus 101 is already in a relationship where it is following the user.

Figure 1:
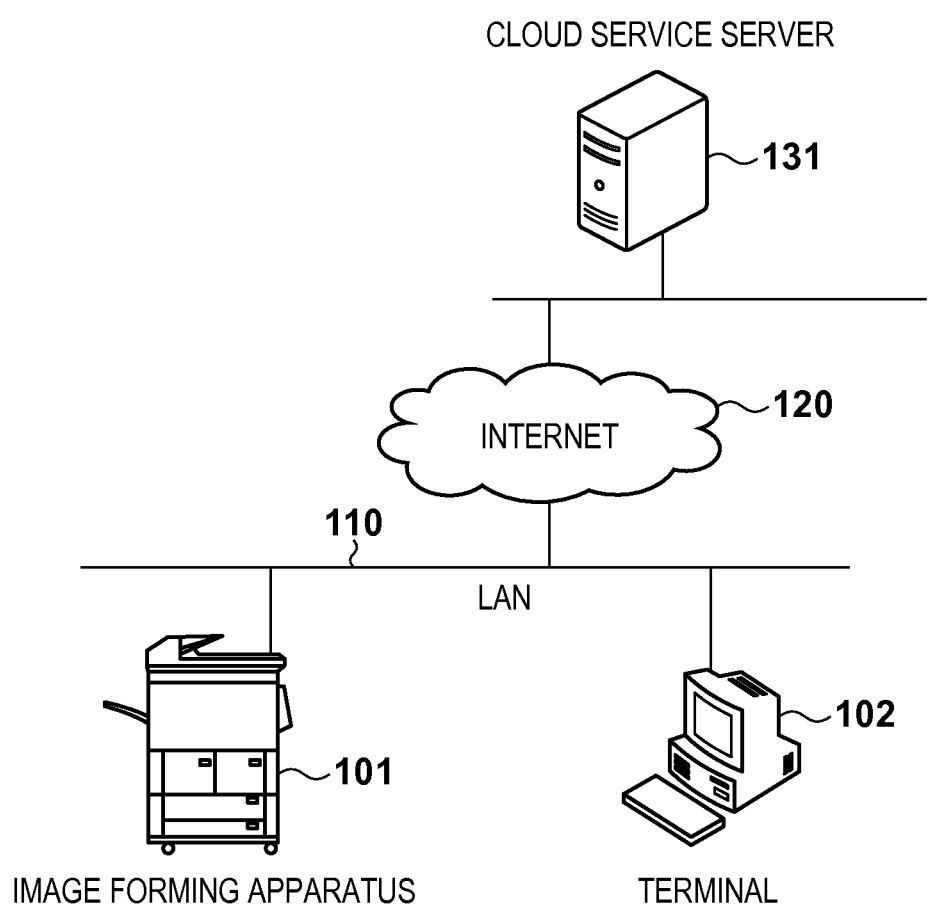
FIG. 1 is a view for showing an overall configuration of a print system according to a first embodiment.

FIG. 1 is a view for showing an overall configuration of a print system according to a first embodiment.

In this system, the image forming apparatus 101 and a terminal 102 are connected by a LAN 110. Also, the LAN 110 is connected to the Internet 120, and a microblogging function providing cloud service server 131 is also connected to the LAN 110 via the Internet 120. Here the terminal 102 is connected to the LAN 110, but the present invention is not limited to this, and it is enough that the terminal 102 can connect to the cloud service server 131.

Figure 2:
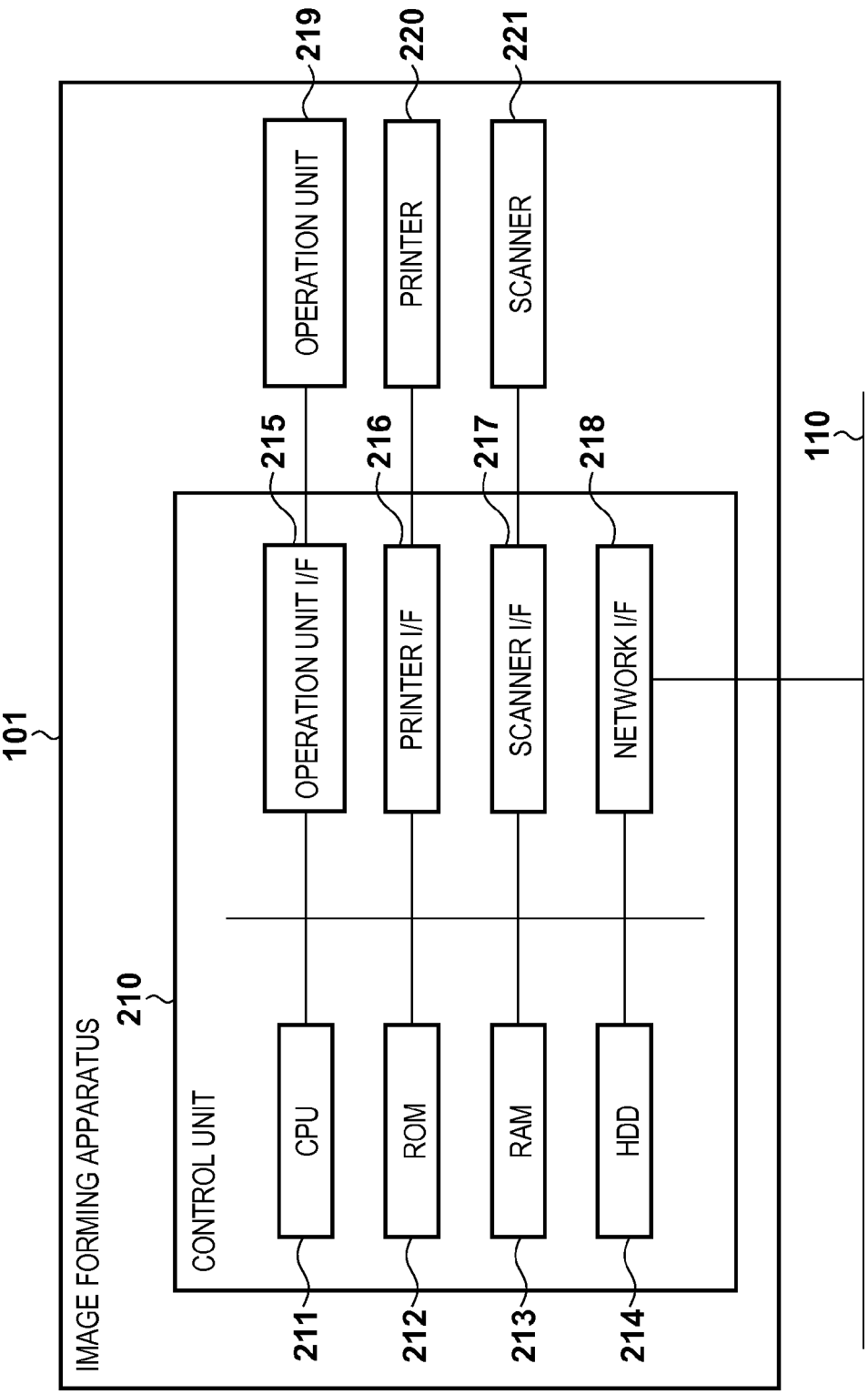
FIG. 2 is a block diagram for showing a hardware configuration of an image forming apparatus according to the first embodiment.

FIG. 2 is a block diagram for showing a hardware configuration of the image forming apparatus 101 according to the first embodiment.

The image forming apparatus 101 exemplifies an example of a multifunction peripheral having a print function, a scan function and the like. The image forming apparatus 101 provides, as a hardware configuration, a control unit 210, an operation unit 219, a printer 220 and a scanner 221. The control unit 210 comprises a CPU 211, a ROM 212, a RAM 213, an HDD 214, an operation unit I/F 215, a printer I/F 216, a scanner I/F 217 and a network I/F 218. The control unit 210, which includes the CPU 211, controls operation of the image forming apparatus 101 on the whole. The CPU 211 performs various control such as control of scanning of an original by the scanner 221, control of transmission of image data to the LAN 110, and print control using the printer 220 according to a control program loaded into the RAM 213 by a boot program in the ROM 212. The ROM 212 stores such things as the boot program executed when the image forming apparatus 101 starts up and various settings. The RAM 213 is used as a temporary storage area such as a main memory and as a work area for the CPU 211.

The HDD 214 has on it installed an OS, and various programs for executing processing described with reference to the later explained flowcharts, and stores image data scanned by the scanner 221, image data, and various information tables. The operation unit I/F 215 controls an interface between the operation unit 219 and the control unit 210. The operation unit 219 has an liquid crystal display unit having a touch panel function, a keyboard, or the like, and may also comprise a user authentication unit, or the like, for accepting user authentication when user authentication is performed with a card or the like. The printer I/F 216 connects the printer 220 and the control unit 210. Image data to be printed on the printer 220 is transferred from the control unit 210 to the printer 220 via the printer I/F 216, and printed by the printer 220 onto a recording medium (a sheet). The scanner I/F 217 connects the scanner 221 and the control unit 210. The scanner 221 scans an image on an original, generates image data, and inputs it into the control unit 210 via the scanner I/F 217. The network I/F 218 connects the control unit 210 (the image forming apparatus 101) to the LAN 110. The network I/F 218 exchanges image data and various information via the terminal 102 on the LAN 110 and the Internet 120 with the cloud service server 131.

Figure 3:
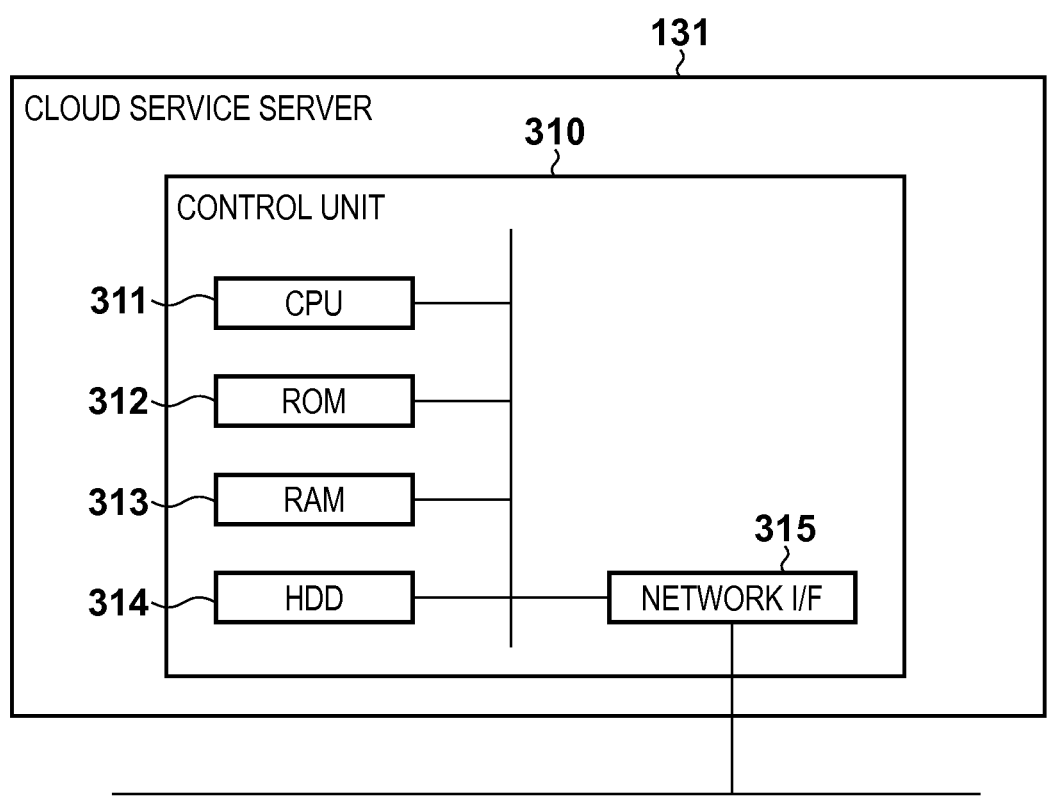
FIG. 3 is a block diagram for showing a configuration of a cloud service server according to the first embodiment.

FIG. 3 is a block diagram for showing a configuration of the cloud service server 131 according to the first embodiment.

A control unit 310, including a CPU 311, controls operation of the cloud service server 131 on the whole. The CPU 311 executes various control processing according to a control program loaded into a RAM 313 by a boot program in a ROM 312. The RAM 313 is used as a main memory, a work area, or the like of the CPU 311. An HDD 314 has on it installed an OS, various programs, and the like, and these programs are loaded into the RAM 313 by the boot program in the ROM 312. Also, the HDD 314 stores image data and various kinds of later explained information tables, and the like. A network I/F 315 connects the control unit 310 (the cloud service server 131) to the Internet 120. Also, the network I/F 315 transmits and receives various information via the Internet 120 with other apparatuses on the LAN 110. Note, the configuration of the terminal 102 is the same as the configuration of the cloud service server 131 explained in FIG. 3.

Figure 4:
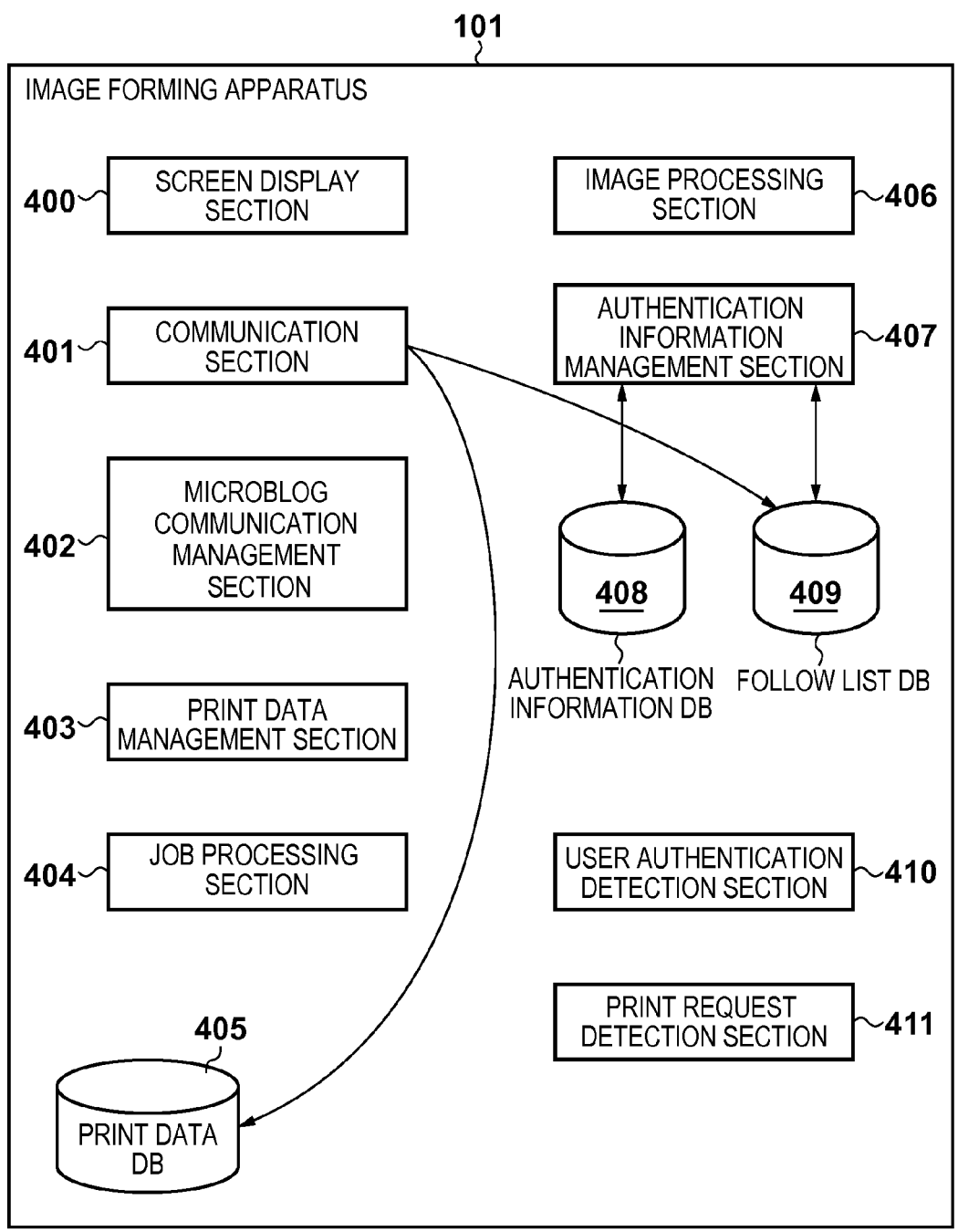
FIG. 4 is a block diagram for explaining a software configuration of the image forming apparatus according to the first embodiment.

FIG. 4 is a block diagram for explaining a software configuration of the image forming apparatus 101 according to the first embodiment. The various functional sections shown in FIG. 4 are realized by the CPU 211 of the image forming apparatus 101 executing a control program loaded into the RAM 213.

The image forming apparatus 101 comprises an screen display section 400, a communication section 401, a microblog communication management section 402, a print data management section 403, a job processing section 404, a print data database 405, an image processing section 406, and an authentication information management section 407. Also, it comprises an authentication information database 408, a follow list database 409, a user authentication detection section 410 and a print request detection section 411. Note, hereinafter the print data database 405 will be abbreviated to the print data DB 405. Also, in the same way, the authentication information database 408 and the follow list database 409 will be abbreviated to the authentication information DB 408 and the follow list DB 409 respectively.

The communication section 401 transmits requests to the cloud service server 131 according to an instruction from the microblog communication management section 402. Also, the communication section 401 receives responses (a reply to the request) from the cloud service server 131. The communication section 401 acquires a list in which follow relationships are described from the cloud service server 131 and stores this list in the follow list DB 409.

Also, the communication section 401, according to an instruction from the microblog communication management unit 402, monitors for new messages of users that the image forming apparatus 101 follows. Specifically, the communication section 401, according to an instruction from the microblog communication management unit 402, transmits a request requesting a list of messages to the cloud service server 131. The communication section 401 then receives a response to the request from the cloud service server 131. This communication is performed a particular number of times within a predetermined time period. When the list of messages is updated, it is determined that a new message was registered.

When it is determined that a new message from the user was registered, the communication section 401 acquires the message, and also notifies the microblog communication management section 402 that a new message was registered. The print request detection section 411, according to an instruction from the microblog communication management section 402, determines whether or not the message includes a print request. If the message includes a print request, a storage location of the print data, print settings and the like are determined from the message and sent in notification to the microblog communication management section 402.

The communication section 401 acquires print data from a storage location of the cloud service server 131 that the message designates, according to an instruction from the microblog communication management section 402, and stores the print data in the print data DB 405. Next, the microblog communication management section 402 sends in notification user information of the user that requested the print and the request time to the authentication information management section 407 and notifies the print data management section 403 that new print data was added.

The print data management section 403 manages print data, settings and the like that were sent in notification from the microblog communication management section 402. The authentication information management section 407, in a case where user authentication is not performed within a predetermined time period from the print request time of the user that the microblog communication management section 402 sent in notification, notifies the microblog communication management section 402. Next, the microblog communication management section 402 once again monitors the cloud service server 131 for messages of the user that the image forming apparatus 101 follows. The print request detection section 411, according to an instruction from the microblog communication management section 402, determines whether or not a message input by the user that requested the print includes a print request. When the message does not contain a print request, the communication section 401, according to an instruction from the microblog communication management section 402, notifies the cloud service server 131 that the user requested a print but has yet to execute the print by posting a comment. This corresponds to a case where the user that requested the print with a message did not perform user authentication in order to execute the print in a predetermined time period from when the message was displayed and also the user registered a message that does not include a print request. In this case, there is a possibility that the user has forgotten having requested the print, and also, because the user is inputting a message, the possibility that he or she is viewing the Web page can be considered to be high. Thus, in this case, notification that the user requested the print but has yet to execute the print is made by posting a comment. With this, the user almost certainly will be able to notice that he or she requests the print but has yet to execute the print by seeing the comment.

The user authentication detection section 410 notifies the authentication information management section 407 of authentication operation by the user. The authentication information management section 407 authenticates whether or not an authenticating user performed a print request by comparing user information entered by the user against data of the authentication information DB 408. If this authentication succeeds, notification of the job processing section 404 is made in order that print data that the user registered be printed. The job processing section 404, according to an instruction to print, carries out printing in accordance with print data stored in the print data DB 405. Then the microblog communication management section 402 is notified of this. Here, the screen display section 400 displays a screen for print operation to be executed on the operation unit 210, and if necessary, according to an instruction from the user, a request to change image processing may be made to the image processing section 406, and a print job execution instruction may be made to the job processing section 404. For example, the image processing section 406 accepts and processes color processing, edge emphasis processing, screen changes and the like. When the printing completes, the screen display section 400 displays that the print completed. Also, the microblog communication management section 402 instructs the cloud service server 131 via the communication section 401 with a print output notification indicating that the print completed. The content of the print output notification is text that a human can interpret such as, for example, "print completed". Also, the microblog communication management section 402 performs management of transmitted messages.

Figure 5:
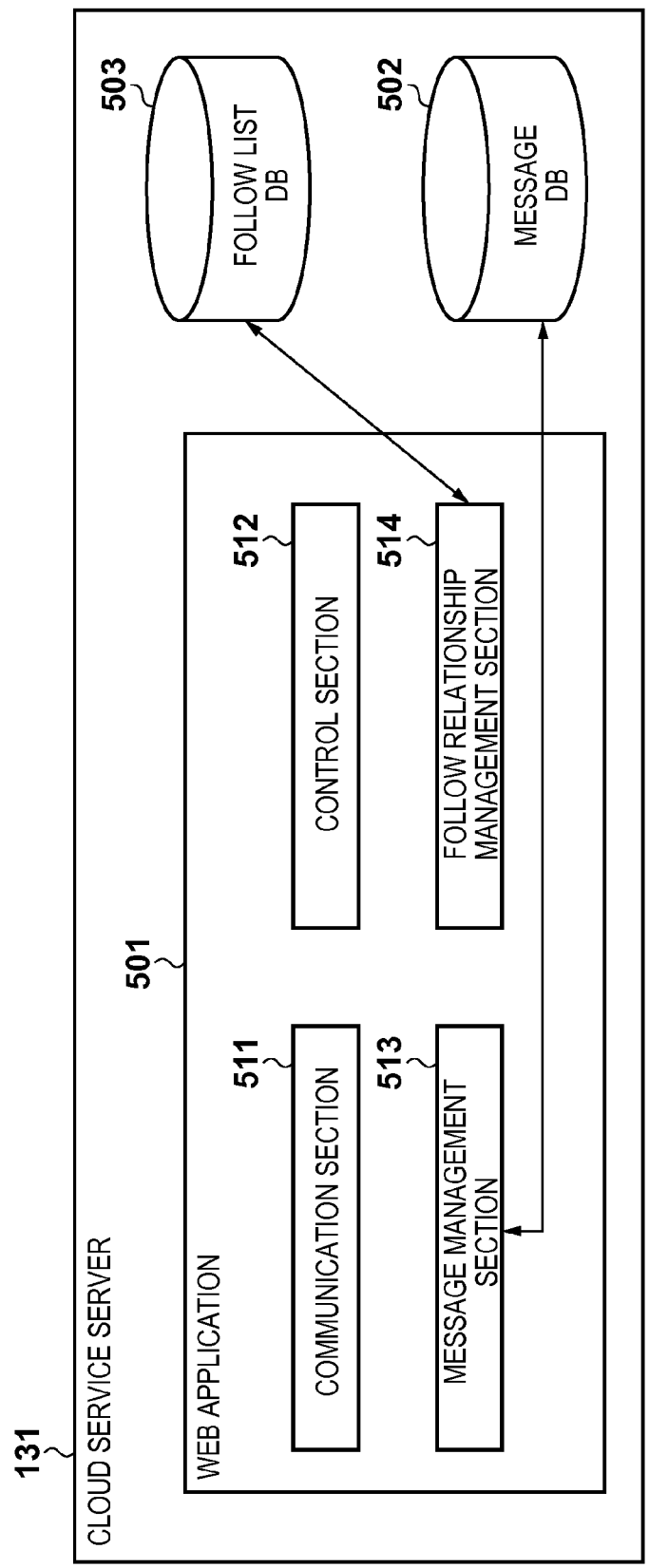
FIG. 5 is a block diagram for explaining a software configuration of the cloud service server according to the first embodiment.

FIG. 5 is a block diagram for explaining a software configuration of the cloud service server 131 according to the first embodiment. The various functional sections shown in FIG. 5 are realized by the CPU 311 of the cloud service server 131 executing a control program.

The cloud service server 131 comprises a Web application 501, a message database 502 (hereinafter referred to as message DB 502), and a follow list database 503 (follow list DB).

The Web application 501 is a Web application for providing a CRM service or the like. In the first embodiment, the microblogging function is provided in the Web application 501. The Web application 501 comprises a communication section 511, a control section 512, a message management section 513 and a follow relationship management section 514.

The communication section 511 receives a request from the image forming apparatus 101 or the terminal 102 (PC, etc.), and transmits that request information to the control section 512. Furthermore, the communication section 511 receives a processing result for the request from the control section 512, creates response data in response to the request, and transmits the response to the image forming apparatus 101 or the terminal 102.

The control section 512 extracts a message or comment included in the request according to the content of the request transmitted from the communication section 511 and makes a request to the message management section 513 for registration processing for the message or comment. The message management section 513 receives the message or comment transmitted from the control section 512 and stores it in the message DB 502. Also the message management section 513, upon request from the control section 512, acquires the message or comment registered in the message DB 502 from the message DB 502, and transmits it to the control section 512.

The follow relationship management section 514 manages the relationship of the followers and those who are followed. Specifically, for a case where the image forming apparatus 101 follows a particular user, when that user performs setting so that the image forming apparatus 101 follows the user, the image forming apparatus 101 makes a request to the communication section 511 to the effect that the user be followed. Next the communication section 511 sends a notification of this to the follow relationship management section 514. With this, the follow relationship management section 514 adds to the follow list DB 503 something to the effect that the image forming apparatus 101 follows that user. With this, a follow relationship is registered. Above is an explanation of registration of a follow, and the deletion of a follow relationship is executed by similar steps.

Also, the case where a user follows the image forming apparatus 101 is performed similarly. Specifically, the user makes a request to follow the image forming apparatus 101 to the communication section 511 using the terminal 102 (PC, etc.). The communication section 511 notifies the follow relationship management section 514 of this, and the follow relationship management section 514 adds to the follow list DB 503 something to the effect that the user follows the image forming apparatus 101.

In this way the cloud service server 131 can register and manage messages and comments input using the microblogging function, and also register and manage follow relationships with the user and the image forming apparatus 101.

Figure 6:
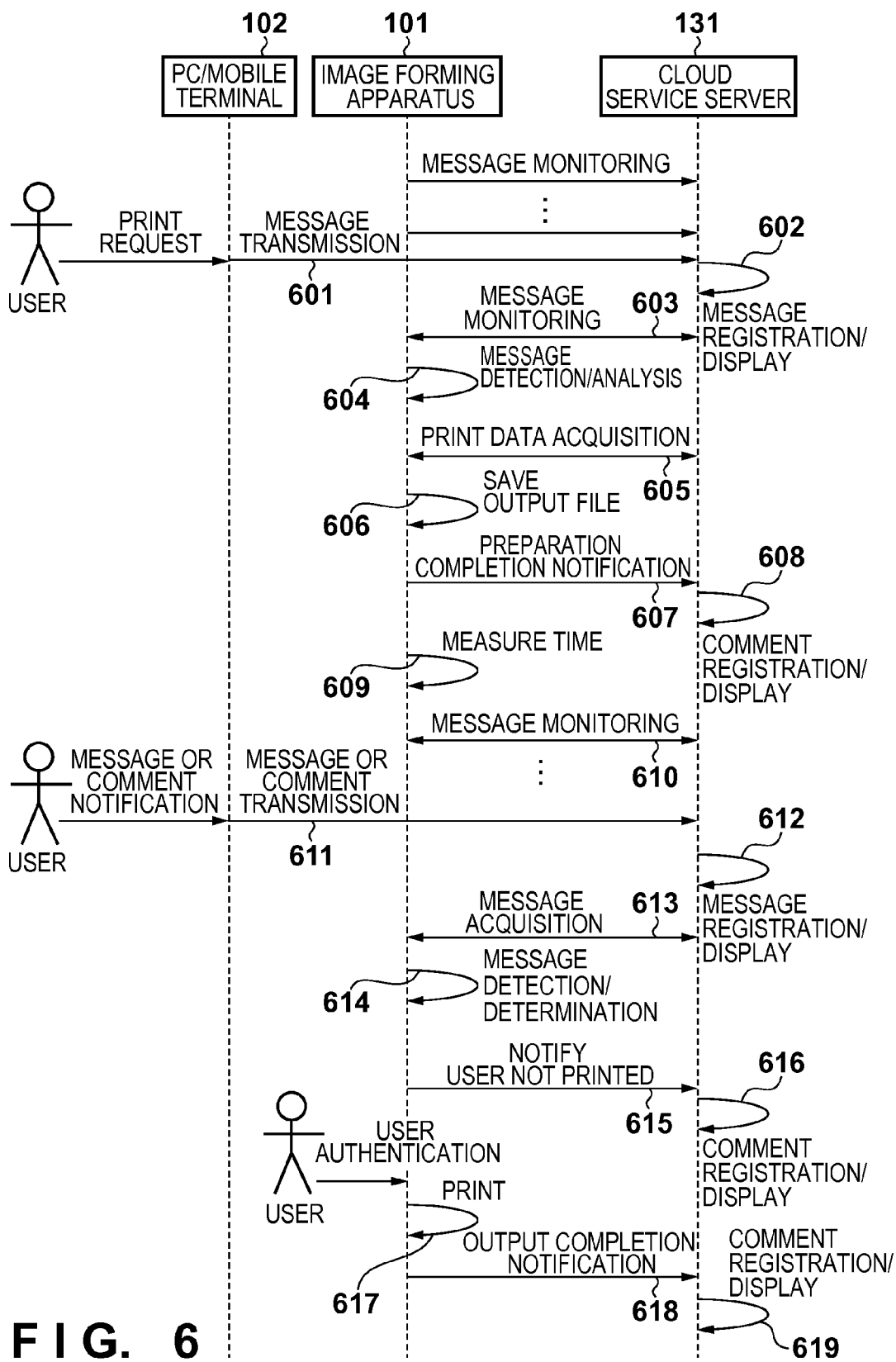
FIG. 6 is a sequence diagram for explaining a processing sequence that a terminal, the image forming apparatus and the cloud service server execute according to the first embodiment of the present invention.

FIG. 6 is a sequence diagram for explaining a processing sequence that the terminal 102, the image forming apparatus 101 and the cloud service server 131 execute according to the first embodiment of the present invention. Note, the details of the processing of the image forming apparatus 101 will be explained later with reference to the flowchart of FIG. 8.

Here, a case where after the user first performed a print request from the terminal 102 by inputting a message but did not go to the location of the image forming apparatus 101 and make a print instruction right away will be explained.

In numeral 601, the user accesses the cloud service server 131 using a Web browser of the terminal 102 (PC, etc.) and transmits a message such as, for example, "please print 2 copies of PROJECT_Y-RESOURCE_MANAGEMENT.xls". In numeral 602, the cloud service server 131 receives the message that the user transmitted in numeral 601 and registers it in the message DB 502.

In numeral 603, the image forming apparatus 101 monitors for message or comments that the user that the image forming apparatus is following registered on the cloud service server 131. Next, if there is a new message, the message is acquired. Here, whether or not a new message exists is periodically checked. In numeral 604, the image forming apparatus determines whether or not a message acquired in numeral 603 includes a print request, and if the message does include a print request, a storage location of print data is acquired by analyzing the message. Next, in numeral 605, the image forming apparatus 101 acquires (file acquisition) print data that the user instructed the print for from the storage location of the print data on the cloud service server 131. Here the file PROJECT_Y-RESOURCE_MANAGEMENT.xls is acquired. Next, in numeral 606, the image forming apparatus 101 saves the acquired print data to the print data DB 405. Next, in numeral 607, the image forming apparatus 101 notifies the cloud service server 131 that print preparation completed. In numeral 608, the cloud service server 131 receives and registers into the message DB 502 a comment (for example "print preparation completed") that the image forming apparatus 101 transmitted in response to the message by which the user performed the print request.

Next, in numeral 609 the image forming apparatus 101 measures the elapsed time until a print is instructed by a user from the time that the message acquired in numeral 603 was displayed. When the elapsed time becomes larger than a predetermined time, the image forming apparatus 101, in numeral 610, monitors for newly registered messages or comments from that user, as in numeral 603. Note, a case where, in numeral 609, the user executed printing by authenticating and making a print instruction before the predetermined time has elapsed will be explained later.

Next, in numeral 611, the user accesses the cloud service server 131 using a Web browser of the terminal 102 (PC, etc.) and transmits "Mr. AAA, BBB DDD" which is a message totally unrelated to the aforementioned print request. With this, in numeral 612, the cloud service server 131 receives the message that the user transmitted and registers it in the message DB 502. With this, in numeral 613, the image forming apparatus 101 monitoring for a message newly registered to the cloud service server 131 acquires the new message or comment. Next, in numeral 614, the image forming apparatus 101 detects that the message or comment is from the user and analyzes the message or comment. However, here the message or comment is not instructing a printing. Here, it is determined that the user is currently viewing the terminal 102 (PC, etc.) and in numeral 615 the image forming apparatus 101 transmits a message to the cloud service server 131 indicating that the print request from the user has not yet been executed. Specifically, a message or comment that a human can interpret such as "please print 2 copies of PROJECT_Y-RESOURCE_MANAGEMENT.xls. 2011/03/18 (10:58)" is transmitted. This notification may be sent to the cloud service server 131 as a new message, or may be sent to the cloud service server 131 as a comment in response to the message "Mr. AAA, BBB CCC" that the user posted. Here, it is a comment in response to the message "Mr. AAA, BBB CCC". With this, in numeral 616, the cloud service server 131 receives and registers to the message DB 502 the comment that the message DB 502 transmitted in response to the user message, and also displays the comment on the Web page of the terminal 102.

With this, the user that is operating the terminal 102 recognizes that the requested print has not been executed, goes to the location of the image forming apparatus 101, performs user authentication and make a print instruction. So, in numeral 617, the image forming apparatus 101 receives the user authentication, and execute the print job instructed by the user, and prints 2 copies of the print data saved in the print data DB 405 in numeral 606. Then, in numeral 618, the image forming apparatus 101 transmits a comment such as, "print completed" to the cloud service server 131. With this, in numeral 619, the cloud service server 131 receives and registers to the message DB 502 the comment which is in response to the print request message that the user posted.

On the other hand, in a case where the user immediately came to the location of the image forming apparatus 101 after performing the print request and made a print request, the user will have performed user authentication before the predetermined time has elapsed. In this case, after numeral 609, the operation of numerals 617 through 619 is executed.

Figure 7:
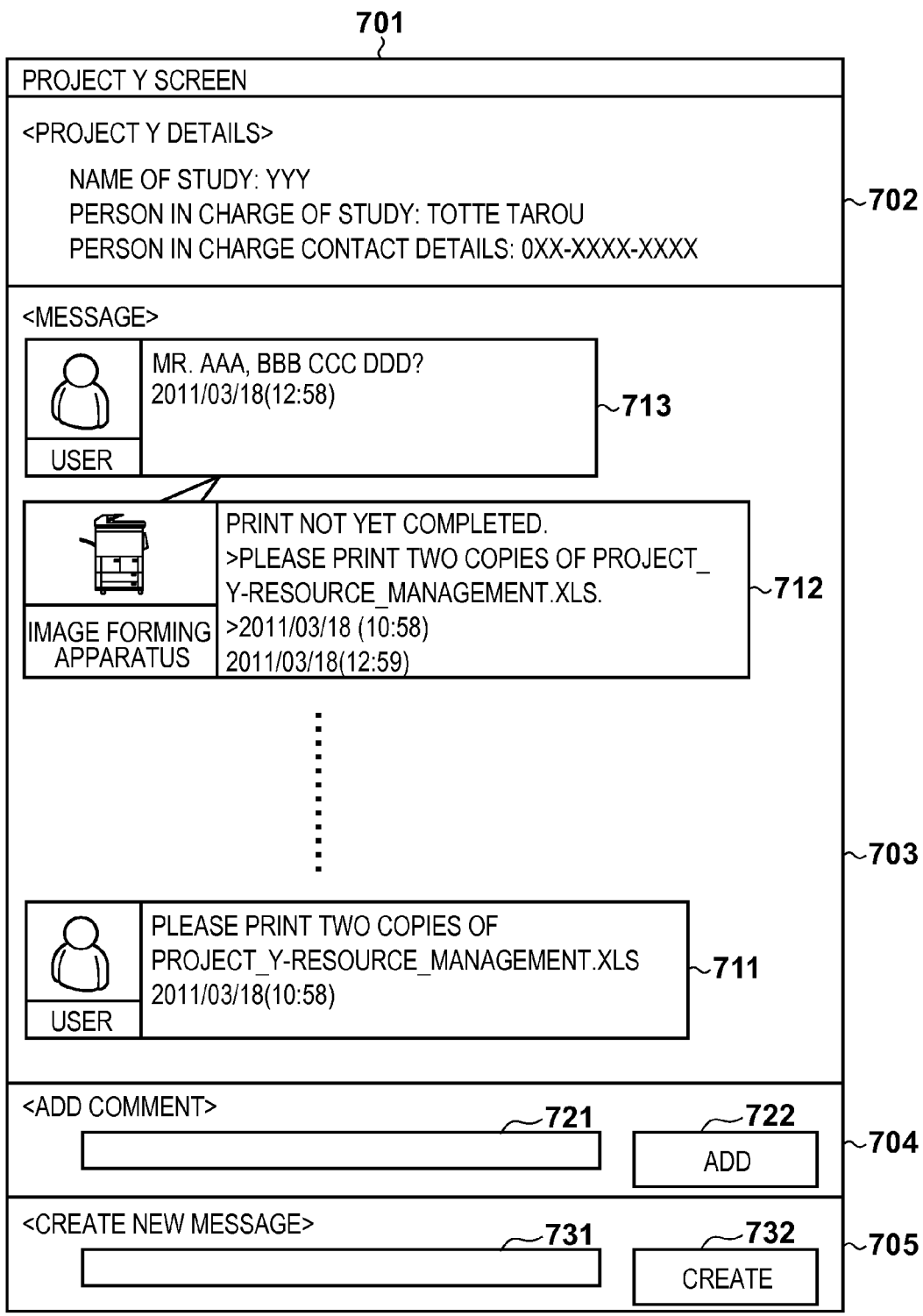
FIG. 7 is a view for explaining a microblogging function provided by the cloud service server according to the first embodiment of the present invention.

FIG. 7 is a view for explaining a microblogging function provided by the cloud service server 131 according to the embodiment of the present invention. FIG. 7 shows an example of a Web page displayed on the terminal 102 by accessing the cloud service server 131 from a Web browser operating on the terminal 102 such as a PC or a mobile terminal. Here, the cloud service server 131 is managing a currently in progress project for the purpose of development support.

Numeral 701 denotes an example display of a project Y screen that displays information relating to the currently in progress project. The project details area 702 is showing information related to this project Y such as the study name, the study person in charge, and the study person in charge contact. The message display area 703 displays messages and timelines comprising comments to the messages.

In the message display area 703, the user has registered a message 711 that states, "please print two copies of PRO-JECT_Y-RESOURCE_MANAGEMENT.xls". After that, after a predetermined time period has elapsed without the user performing user authentication and a print instruction using the image forming apparatus 101, a message 713, "Mr. AAA, BBB CCC DDD?" is input. A case in which in response to this, the image forming apparatus 101 has registered a comment 712, "print not yet completed. please print 2 copies of PROJECT_Y-RESOURCE_MANAGEMENT.xls. 2011/03/18 (10:58)" is shown.

Here, the image forming apparatus 101 is in a relationship where it is following the user. As for the following, when the user goes to the location of the image forming apparatus 101 sets so that the image forming apparatus 101 follows him or her, the image forming apparatus 101 follows the user. With this, the image forming apparatus 101 is able to display the message 711 that the user posted on a Web page specific to the image forming apparatus 101. Also, by analyzing the message 711 posted by the user, the image forming apparatus 101 determines whether or not the message 711 of the user includes a print request.

Also, the print data "PROJECT_Y-RESOURCE_MANAGEMENT.xls" which is the target of the print comprises a storage destination or link information. Here, the storage destination may be the cloud service server 131, an external server or the like. With this, the image forming apparatus 101 can acquire print target print data. Also, here, the print target data is an Excel (registered trademark) file, but it is not limited to this and may be data of an Adobe PDF (registered trademark, Word (registered trademark) or the like.

When the user inputs a comment into the comment input field 721 of the comment input area 704 and presses the add button 722, a comment add request is transmitted from the Web browser to the cloud service server 131. The cloud service server 131, having received this comment add request, registers the comment input into the comment input field 721 to the message DB 502. With this, when the user accesses the cloud service server 131 with a Web browser, the registered comment is displayed on the Web browser as was the previously described comment 712.

When the user inputs a message into the message input field 731 in the message input area 705 and presses the create button 732, a message creation request is transmitted from the Web browser to the cloud service server 131. The cloud service server 131 having received the message creation request, registers the input message to the message DB 502. With this, when the user accesses the cloud service server 131 with the Web browser, as with the previously described messages 711 and 713, the created message is displayed on the Web browser.

Figure 8:
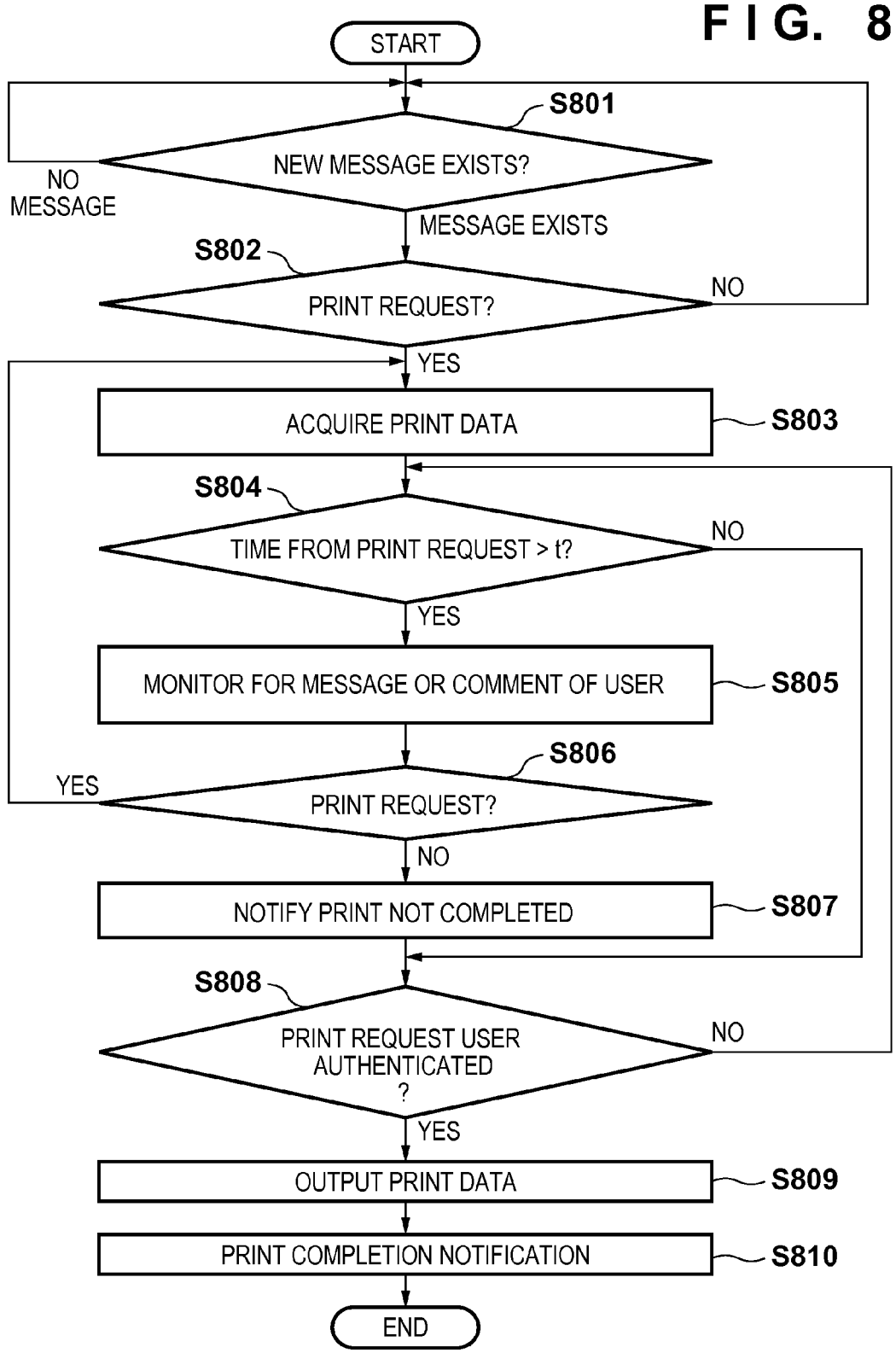
FIG. 8 is a flowchart for describing processing by the image forming apparatus according to the first embodiment.

FIG. 8 is a flowchart for describing processing by the image forming apparatus 101 according to the first embodiment of the present invention. Note, the program that executes this processing is installed in the HDD 214, loaded into the RAM 213 at execution time, and executed under the control of the CPU 211.

Firstly, in step S801, the CPU 211 determines whether or not there is a message newly registered to the client service server 131. Specifically, the communication section 401 of the image forming apparatus 101, according to an instruction from the microblog communication management section 402, transmits a request requesting registered messages to the cloud service server 131. With this, messages of the followed user are displayed on the Web page of the image forming apparatus 101. Next, the communication section 401 determines whether or not there is a new message. If there is a new message, the communication section 401 acquires the message, and the processing proceeds to step S802, and if there is no new message, step S801 is performed again.

In step S802, the CPU 211 determines whether or not the new message acquired in step S801 includes a print request. Specifically, the print request detection section 411 of the image forming apparatus 101, according to an instruction from the microblog communication management section 402, analyzes the message and determines whether or not a print request is included. If the result of this is that it is determined that a print request is included, the processing proceeds to step S803, and if not, step S801 is returned to. The specific processing for monitoring for this message and analyzing will be explained later with reference to FIG. 10.

Next the processing proceeds to step S803, and the CPU 211 makes a request to and acquires print data which is the target of the print request from the cloud service server 131 based on the analysis result of step S802. Specifically, the print request detection section 411 of the image forming apparatus 101, according to an instruction from the microblog communication management section 402, determines a storage location of the print data of the user and notifies the print data management section 403. Next, the communication section 401, according to an instruction from the microblog communication management section 402, acquires print data (a file) from the storage location on the cloud service server 131 that the message designates, and stores it in the print data DB 405. Next, registration into the print data management section 403 is made. Furthermore, the microblog communication management section 402 sends user information of the user that made the print request and the request time in notification to the authentication information management section 407.

FIG. 12 is a view for explaining a print data management table for managing print data stored in the print data DB 405 according to the first embodiment. This print data management table is generated and managed by the print data management section 403.

A print ID 1201 is an identifier of the print data and does not overlap in the print data management table. A print name 1202 stores a character string indicating a name of a document file of the print target included in the message that includes the print request that is analyzed in step S802. Also, the user ID 1203 is registered based on information of the user that dispatched the message including the print request that was analyzed in step S802.

Next, the processing proceeds to step S804 and the CPU 211 determines whether or not the user has forgotten to execute printing by measuring the elapsed time from the display of the message including the print request, to the print being executed. Specifically, when the authentication information management section 407 of the image forming apparatus 101 measures the elapsed time from the display of the message including the print request and the elapsed time is longer than a predetermined time t, it is determined that the user forgot to execute the printing and the processing proceeds to step S805. On the other hand, in a case where the predetermined time t has not elapsed, the processing proceeds to step S808.

In step S805, the CPU 211 determines whether or not a message has been newly registered using the microblogging function. This determination method is performed in the same was as in step S801. Next, the processing proceeds to step S806 and the CPU 211 determines whether or not a print request is included in the message based on the result of the determination in step S805. This determination is performed in the same way as in step S802. In a case where the result is that a print request in included in the message, the processing proceeds to step S803 and if not the processing proceeds to step S807. Specifically, if once again a message including a print request is registered, in step S803 print data is acquired from the cloud service server 131 based on that message, and once again the elapsed time form when the message including the print request is displayed is measured. Also, in the case of anything other than a message including a print request the processing proceeds to step S807.

In step S807 the CPU 211 notifies the cloud service server 131 that print processing based on the message determined in step S802 has not completed. Specifically, the communication section 401 of the image forming apparatus 101, according to an instruction from the microblog communication management section 402, transmits a message indicating that print has not completed to the cloud service server 131. Next, the processing proceeds to step S808, and the CPU 211 determines whether or not user authentication was performed by the user that registered the message determined in step S802. Specifically, the user authentication detection section 410 of the image forming apparatus 101 notifies the authentication information management section 407 when user authentication operation is detected. With this, the authentication information management section 407 determines whether or not the user has usage permission for the image forming apparatus 101 by comparing user information input by the user against the user authentication DB 408. If the result of the determination is that the user authentication succeeded, the processing proceeds to step S809, and if the user authentication did not succeed, the processing proceeds to step S804.

In step S809, the CPU 211 reads out the print target print data stored in the print data DB 405 and outputs to the printer 220. Specifically, the job processing section 404 of the image forming apparatus 101 reads out print data stored in the print data DB 405 and performs printing by outputting the print data to the printer 220 via the printer I/F 216. Next, when the printing completes, in step S810, the CPU 211 notifies the cloud service server 131 and also displays to a UI. Specifically, the job processing section 404 of the image forming apparatus 101 notifies the microblog communication management section 402 that the printing completed. Next, the communication section 401, according to an instruction from the microblog communication management section 402, transmits a print completion notification to the cloud service server 131. Also, the screen display section 400 displays that the print completed.

In this way in the first embodiment, print processing is executed based on a message registered by the user upon user authentication on the image forming apparatus 101. Also, when the elapsed time after the requested printing by posting a message until a print is performed is longer than a predetermined time period, it is determined that the user has forgotten to execute print processing, and a message indicating that printing has not be completed is displayed to the user. Because the display of this message is made upon the user, using the Web page, registering a new message or comment, the user can definitely see the message indicating that printing has yet to be completed and understand the situation.

Figure 10:
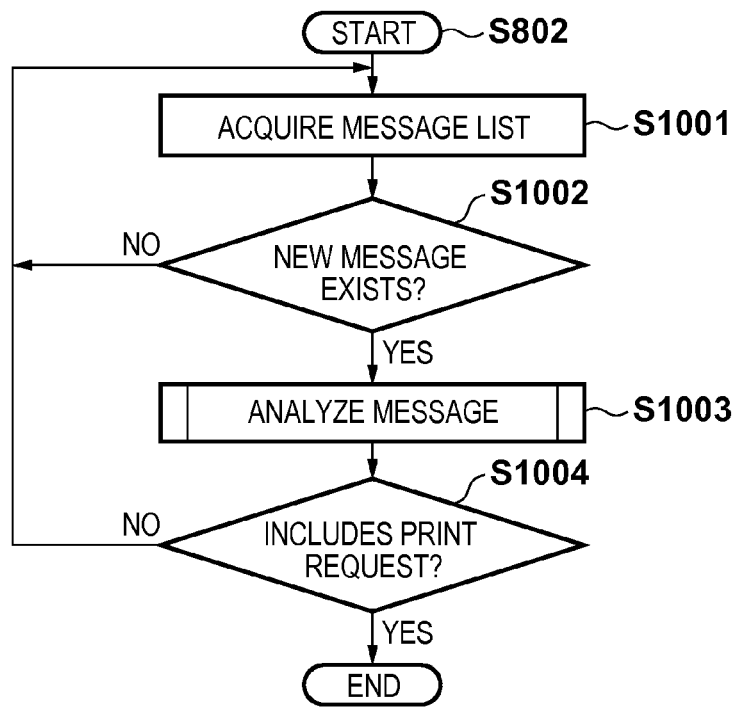
FIG. 10 is a flowchart for describing the details of search processing for the searching of a message including a print request by the image forming apparatus according to the first embodiment.

FIG. 10 is a flowchart for describing the details of search processing (S802) for the searching of a message including a print request by the image forming apparatus 101 according to the first embodiment.

Firstly, in step S1001, the microblog communication management section 402 acquires from the cloud service server 131 list information of messages registered on the cloud service server 131 via the communication section 401. Next, the processing proceeds to step S1002, and it is determined whether or not a new message was added to the list information. In a case where a new message exists, the processing proceeds to step S1003, and in a case where a new message does not exist step S1001 is executed once again. In step S1003, the content of the new message acquired in step S1002 is analyzed, it is determined whether or not a print request is included and the processing of the following steps is executed. The analysis processing of the message is explained later with reference to FIG. 11. In step S1004, based on the result of analysis processing in step S1003, determination as to whether or not the message includes a print request is made. If the message does include a print request, the processing completes, but in a case where the message does not include a print request the processing proceeds to step S1001.

Figure 11:
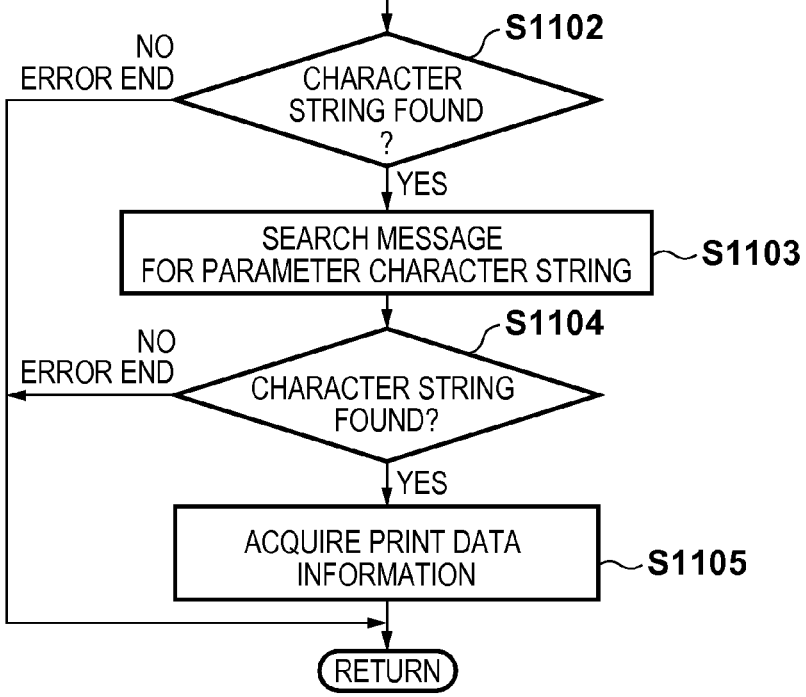
FIG. 11 is a flowchart for describing message analysis processing by the image forming apparatus according to the first embodiment of the present invention.

FIG. 11 is a flowchart for describing the details of the message analysis processing of step S1003 of FIG. 10 by the image forming apparatus 101 according to the second embodiment of the present invention. FIGS. 13A and 13B are views for explaining a command character string management table and a parameter character string management table respectively.

In the flowchart of FIG. 11, the microblog communication management section 402 analyzes the message read out in step S1002 of FIG. 10. The message may be, for example, described in the following format. "Please print two copies of PROJECT_Y-RESOURCE_MANAGEMENT.xls". The microblog communication management section 402 determines whether or not a print request command is included in the message, and furthermore, it determines the settings such as the print data that is the target of the print request, the print data storage location, and the number of copies to print.

Firstly, in step S1101, the microblog communication management section 402 searches to determine whether a character string indicating a command of a command character string management table 1301 shown in FIG. 13A is included in the message. In step S1102, based on the search result of step S1101, it is determined whether or not a character string indicating the command is included in the message. In a case where the character string indicating the command in step S1102 was found, the processing proceeds to step S1103, and in a case where the character string was not found, the flow completes in error because the comment cannot be processed.

In the case of the aforementioned message, because the character string "print" is included, it can be determined from the command character string management table of FIG. 13A that the processing function 1302 of the command "print" is the print function. In a case where a character string indicating a command was found, the microblog communication management section 402, in step S1103, searches to determine whether or not the character string included in the parameter character string 1311 of the parameter character string management table of FIG. 13B is included in the message. In step S1104, it is determined whether or not a character string indicating a parameter is included in the message based on the search result of step S1103. In step S1104, in a case where a character string indicating the parameter is found to be in the message, the processing proceeds to step S1105, and in a case where, in step S1103, a character string indicating a parameter was not found, the flow completes in error because the comment cannot be processed. In the case of the aforementioned message, because "two copies" can be found, it is determined that a character string indicating a parameter was found, and it can be determined that the number of copies to be processed is two copies from the processing function 1312 corresponding to FIG. 13B.

In this way, by the processing from step S1102 to S1104, it can be determined that the message is instructing that print processing for two copies of the document file "PROJECT_Y-RESOURCE_MANAGEMENT.xls" be performed. Next, in step S1105, the storage information of the print data found in step S1104 is acquired. Accordingly, in the case of the aforementioned message, it is determined that the message does include a print request command in step S802 of FIG. 8, the processing proceeds to step S803, and based on the storage information of the print data acquired in step S1105 of FIG. 11, print data is acquired from the cloud service server 131.

As explained above, with the first embodiment, it is possible to notify that the user has forgotten to execute printing event despite having performed a print request when the user accesses the cloud service server 131 using a Web browser of the terminal 102.

Also, a case where a print request was made but then the print request is cancelled. In such a case, the user registers a message that includes "print cancel" to the cloud service server 131. With this, in step S806 of FIG. 8, the "print cancel" command included in the message is found on analysis, and the print request the user made is cancelled. Next, the processing proceeds to step S810, the cloud service server 131 is notified that the print was cancelled and the processing completes. With this kind of processing, it is possible to handle the case where the user wishes to cancel a print request after making the print request.

[Second Embodiment]

In the previously described first embodiment, it was necessary for the user to authenticate when executing the print. In the second embodiment, when the user executes printing, printing is done of without user authentication on the image forming apparatus 101. Explanation will be given for a case where confirmation of whether the user has forgotten to take print material is made by posting a message or comment that the user went to the location of the image forming apparatus 101 and took the print material. Here, only explanation of parts differing with the first embodiment will be given; the method of searching message and comments, and the analysis method are the same as the first embodiment and will not be described here. Also, the system configuration, and the configurations of the image forming apparatus 101, the terminal 102 and the cloud service server 131 are the same as in the previously described first embodiment and so explanation of these will be omitted. Note, in the software configuration of the image forming apparatus 101, it is assumed that the authentication information management section 407 and the authentication information DB 408 do not exist in the second embodiment.

Figure 14:
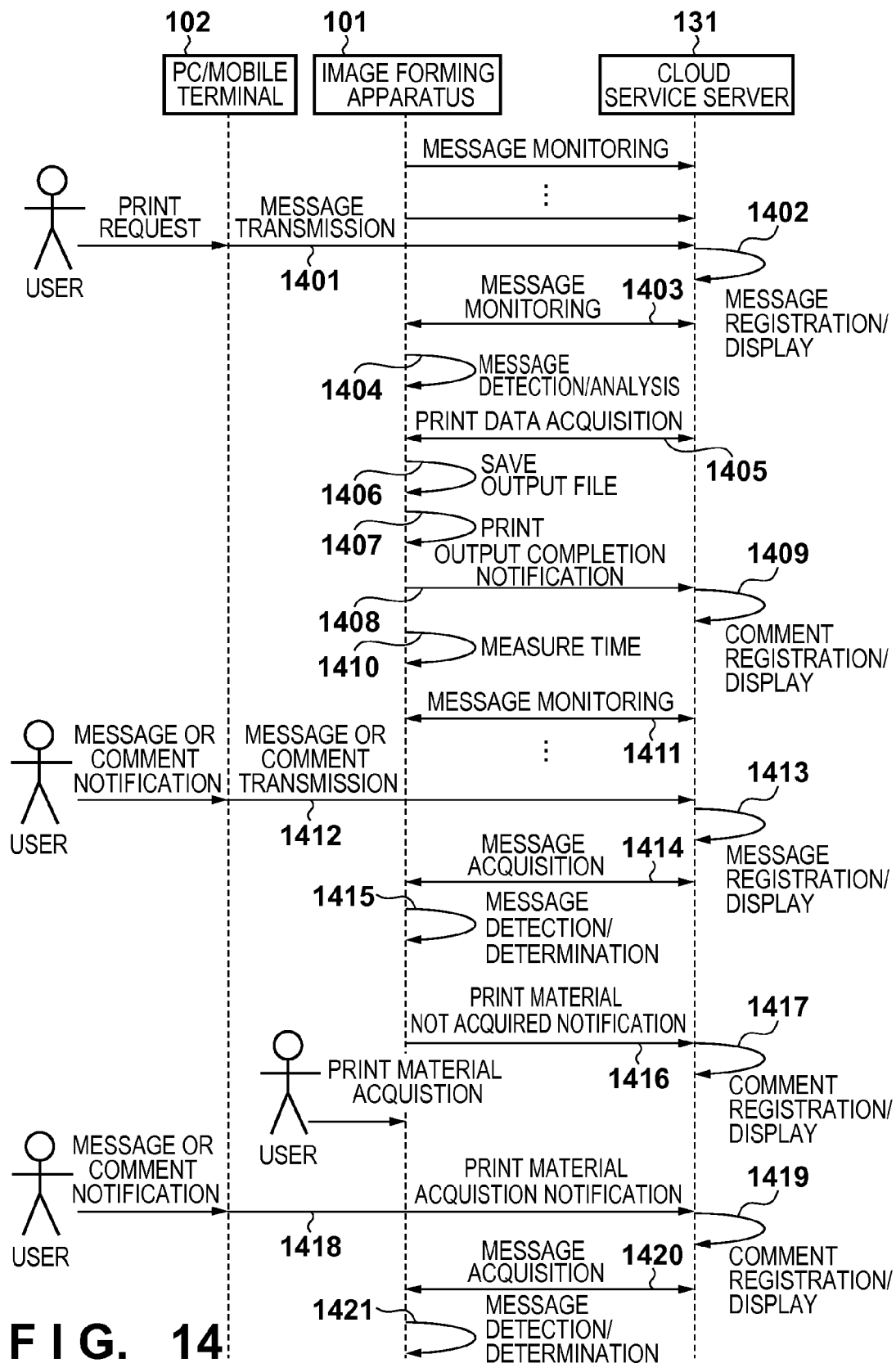
FIG. 14 is a sequence diagram for explaining a processing sequence that the terminal, the image forming apparatus and the cloud service server execute according to the second embodiment of the present invention.

FIG. 14 is a sequence diagram for explaining a processing sequence that the terminal 102, the image forming apparatus 101 and the cloud service server 131 execute according to the second embodiment of the present invention.

A case where a user registers a message including a print request using a microblogging function but does not execute printing right away will be explained. Processing by the image forming apparatus 101 according the second embodiment will be explained later with reference to the flowchart of FIG. 9.

Firstly in numeral 1401, the user accesses the cloud service server 131 using a Web browser of the terminal 102 (PC, etc.) and transmits a message such as "please print 2 copies of PROJECT_Y-RESOURCE_MANAGEMENT.xls". With this, in numeral 1402, the cloud service server 131 receives the message that the user transmitted and registers the message into the message DB 502, and also displays the comment on the Web page.

Next, in numeral 1403, the image forming apparatus 101 monitors the cloud service server 131 for newly registered messages or comments, and when a new message is registered, acquires the message. Here, the image forming apparatus 101 periodically check whether or not a new message exists. In numeral 1404, the image forming apparatus 101 determines whether or not the message includes a print request from the content of the new message acquired in numeral 1403, and if the message includes a print request, a storage location of the print data is acquired. Next, in numeral 1405, the image forming apparatus 101 acquires print data from the cloud service server 131 based on the storage location. Here the file PROJECT_Y-RESOURCE_MANAGEMENT.xls is acquired. Next, in numeral 1406, the image forming apparatus 101 saves the print data acquired in numeral 1405 to the print data DB 405. Next, in numeral 1407, the image forming apparatus 101 performs a print in accordance with the print data. Next, in numeral 1408, the image forming apparatus notifies the cloud service server 131 that the print completed. Next, in numeral 1409, the cloud service server 131 receives a comment that the user made in response to the print request message that the image forming apparatus 101 transmitted, and registers the comment to the message DB 502, and also displays the comment on the Web page.

By the processing up until this point, by the user simply registering a message stating "please print 2 copies of PROJECT_Y-RESOURCE_MANAGEMENT.xls" to the cloud service server 131 by transmitting the message, 2 copies of PROJECT_Y-RESOURCE_MANAGEMENT.xls are printed.

Next, in numeral 1410, the image forming apparatus 101 measures an elapsed time from when the message acquired in numeral 1403 was displayed, and when the elapsed time is longer than a predetermined time, monitors to determine whether or not a new message was registered in numeral 1411. On the other hand, a case where the user comes to the image forming apparatus 101 to take the print material before the elapsed time became longer than the predetermined time will be explained later.

In numeral 1411, the image forming apparatus 101 monitors the cloud service server 131 for newly registered messages or comments as in numeral 1403.

In numeral 1412, the user accesses the cloud service server 131 using a Web browser of the terminal (PC, etc.) and transmits a message, "Mr. AA, BB, CC" which is completely unrelated to the print request. With this, in numeral 1413, the cloud service server 131 receives the message that the user transmitted, registers the message in the message DB 502 and also displays the message on a Web page of the terminal 102. Next, in numeral 1414, the image forming apparatus 101 acquires the message or comment newly registered to the cloud service server 131. Next, in numeral 1415, the image forming apparatus 101 make a determination about the acquired message or comment wherein if the message or comment is from the user that previously made the print request, it is determined that the user is currently viewing the screen of the terminal (PC, etc.). Next, in numeral 1416, the image forming apparatus 101 notifies the cloud service server 131 that the user has not acquired the print material that the user requested be printed.

Specifically, a message or a comment that a human can interpret such as "print materials not yet acquired. please take 2 copies of printed PROJECT_Y-RESOURCE_MANAGEMENT.xls. 2011/03/18 (10:58)". This notification may be sent as a new message, or may be sent as a comment in response to the message "Mr. AA, BB CC" that the user posted. With this, in numeral 1417, the cloud service server 131 receives and registers to the message DB 502 the comment that the message DB 502 transmitted in response to the print request message, and also displays the comment on the Web page. With this, the user, in numeral 1401 can notice that the print material that was printed according to the print request message has yet to be acquired. The user may then go to the location of the image forming apparatus 101 and acquire the print material printed in numeral 1407.

Next, in numeral 1418, the user transmits a comment such as "print material acquired" to the cloud service server 131. With this, in numeral 1419, the cloud service server 131 registers the comment to the message DB 502 and also displays the comment to the Web page. Next, in numeral 1420, the image forming apparatus 101 acquires a new message from the cloud service server 131. Next, in numeral 1421, the image forming apparatus 101 analyzes the message, determines that the user acquired the print material, and end the message monitoring processing performed in numeral 1411.

Next, a case where the user, after performing a print request, immediately goes to the location of the image forming apparatus 101 and acquires the print material will be explained. In this case, in numeral 1410, the user registers and displays a comment indicating that the user took the print material before the predetermined time elapses (1418). With this, after numeral 1408, acquisition of print material by the user, and the operation of numerals 1418 through 1421 are executed.

Note, the details will not be described here, but in numeral 1418, instead of notifying the cloud service server 131 that the user acquired the print material, notification may be made to the image forming apparatus 101. Specifically, the image forming apparatus interprets that the user acquired a print material due to a printing from a print result list of a UI of the image forming apparatus 101 when the user selects a print result for acquisition of the print material. With this, the image forming apparatus 101 can notify the cloud service server 131 that the user that requested the print acquired the print material printed in numeral 1407 instead of the user. With this, the user can avoid the trouble of inputting into the Web page of the terminal (PC, etc.) that he or she acquired the print material.

Figure 9:
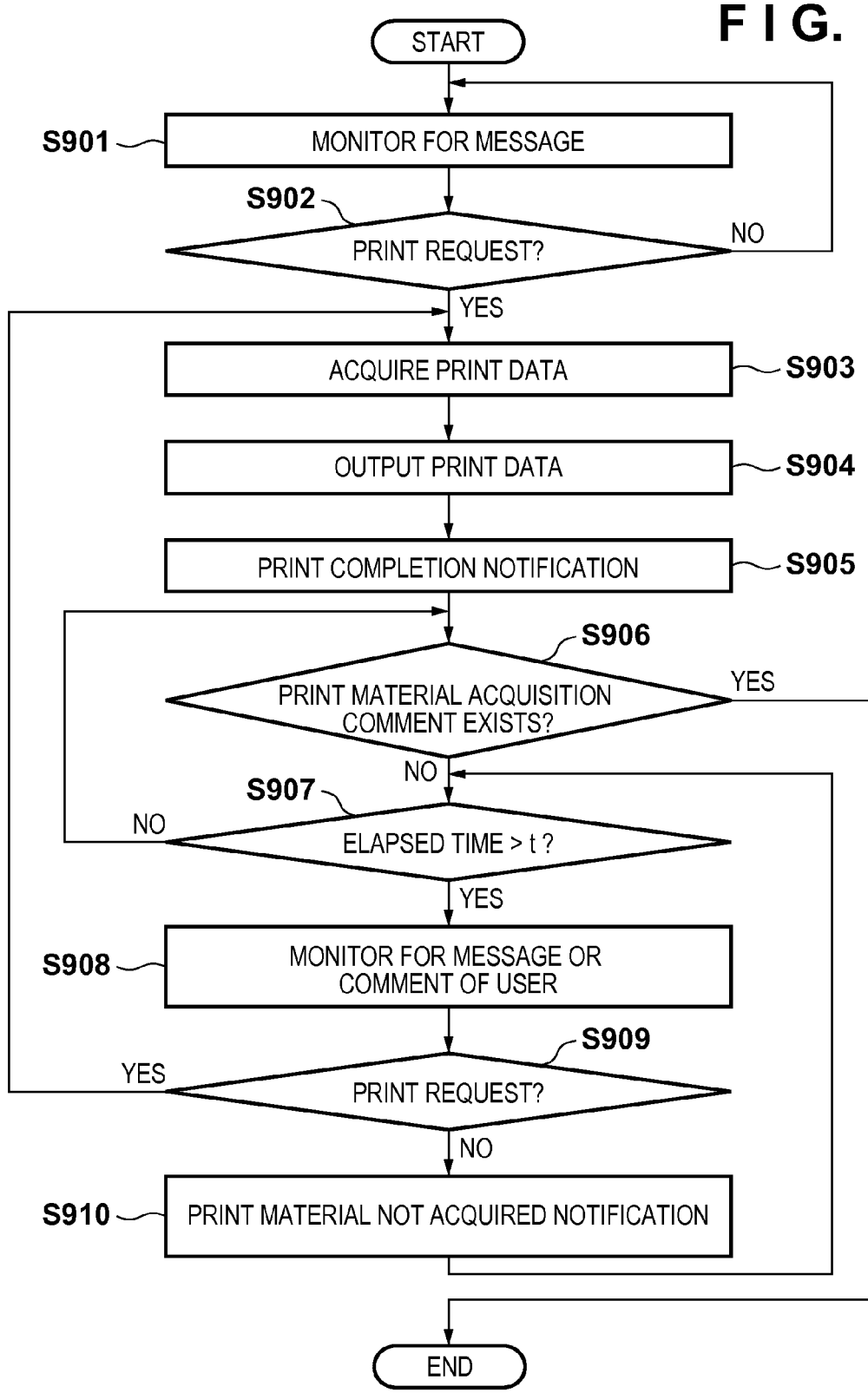
FIG. 9 is a flowchart for describing processing by the image forming apparatus according to a second embodiment of the present invention.

FIG. 9 is a flowchart for describing processing by the image forming apparatus according to the second embodiment of the present invention. Note, the program that executes this processing is installed in the HDD 214, loaded into the RAM 213 at execution time, and executed under the control of the CPU 211.

The processing of steps S901 through S903 of FIG. 9 is the same as the processing of step S801 through S803 in FIG. 8. Firstly, in step S901, the CPU 211 determines whether or not a message was newly registered to the cloud service server 131. If there is a new message, the message is acquired and the processing proceeds to step S902, and if not, step S901 is performed once again. In step S902, the CPU 211 determines whether or not the message includes a print request. If the message includes a print request the processing proceeds to step S903, and if not, step S901 is performed again. In step S903, the CPU 211 requests and acquires print data from the cloud service server 131 and registers the print data to the print data DB 405. Next, the processing proceeds to step S904, and the CPU 211 reads out the print data from the print data DB 405, and prints by outputting to the printer 220. When the print completes, the processing proceeds to step S905, the CPU 211 notifies the cloud service server 131 the print completed and also displays to the operation unit (UI) 129.

Next, the processing proceeds to step S906, and the CPU 211 monitors the cloud service server 131 for messages newly registered, and if there is a new message, acquires the message and analyzes its content. Here, it is determined whether or not the content of the message includes content indicating that the print material acquisition by the user completed. If the message does indicate that the user acquired the print material, the processing completes, but if it does not, the processing proceeds to step S907.

In step S907, the CPU 211 measures the elapsed time from completion of the printing in step S905, and determines whether the elapsed time exceeds a predetermined time t. When the predetermined time t is not exceeded, the processing proceeds to step S906. In step S907, when the elapsed time has exceeded the predetermined time t, it is determined that the user has forgotten to acquire the print material printed in step S904, the processing proceeds to step S908, and the CPU 211 monitors the cloud service server for newly registered messages. This monitoring is performed in the same way as in step S901. Next, when a new message is found, the processing proceeds to step S909, and the CPU 211 determines whether or not the new message includes a print request. The determination method used is the same as the method used in step S902. When the result is that it is determined that a print request is included, the processing proceeds to step S903 and when a print request is not included, the processing proceeds to step S910. Specifically, if again there is a message including a print request, the processing proceeds to step S903, the print data is acquired, and the elapsed time from the print request is once again measured. When the message does not include a print request, the processing proceeds to step S910, the CPU 211 transmits a message to the cloud service server 131 indicating that the user has not acquired the print material, and the processing proceeds to step S907.

With this, the user viewing the Web page on the terminal 102 will notice that the print material which is the result of the print request made by the earlier message has not yet been acquired due to the message or comment posted in response to the user's own message.

As explained above, by the second embodiment, even in a case where an image forming apparatus 101 prints without user authentication being performed, when it can be determined that the user has forgotten to take the print material as a predetermined time period has elapsed since the print was performed, the user is encourage to acquire the print material.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184573, filed Aug. 23, 2012, which is hereby incorporated by reference herein in its entirety.

What is claimed is:

1. An image processing apparatus capable of communicating with a server that provides a microblogging function, the image processing apparatus comprising:
    a detecting unit configured to detect a registration of a first message to the server;
    a processor configured to perform as:
    an acquiring unit configured to acquire image data indicated by the first message whose registration is detected by the detecting unit;
    an output unit configured to output the image data acquired by the acquiring unit;
    a determining unit configured to determine whether or not a predetermined time has elapsed without the output unit having output the image data since the detecting unit detected the registration of the first message; and
    a registration unit configured to register to the server a second message in association with the first message in response to a third message being registered and the determining unit having determined that the predetermined time has elapsed without the output unit having output the image data.

2. The image processing apparatus according to claim 1, wherein the second message includes a character string indicating that an output of the image data has not completed.

3. The image processing apparatus according to claim 1, wherein the second message includes content of the first message.

4. The image processing apparatus according to claim 1, wherein the output unit outputs the image data in accordance with the user that registered the first message whose registration is detected by the detecting unit being authenticated by the image processing apparatus.

5. The image processing apparatus according to claim 1, wherein the output unit prints the image data.

6. A method of controlling an image processing apparatus capable of communicating with a server that provides a microblogging function, the control method comprising:
    detecting a registration of a first message to the server;
    acquiring image data indicated by the first message whose registration is detected;
    outputting the acquired image data;
    determining whether or not a predetermined time has elapsed after the detecting of the registration of the first message; and
    registering to the server a second message in association with the first message in response to a third message being registered and the predetermined time being determined to have elapsed without the image data being output.

7. The control method according to claim 6, wherein the second message includes a character string indicating that an output of the image data has not completed.

8. The control method according to claim 6, wherein the second message includes content of the first message.

9. The control method according to claim 6, wherein the image data is output in accordance with the authentication by the image processing apparatus of a user who registered the first message whose registration is detected.

10. The control method according to claim 6, further comprising printing the outputted image data.

11. A non-transitory computer-readable storage medium storing a program for causing a computer to function as an image processing apparatus comprising:
    a processor configured to perform as:
    a detecting unit configured to detect a registration of a first message to a server;
    an acquiring unit configured to acquire image data indicated by the first message whose registration is detected by the detecting unit;
    an output unit configured to output the image data acquired by the acquiring unit;
    a determining unit configured to determine whether or not a predetermined time has elapsed without the output unit having output the image data since the detecting unit detected the registration of the first message; and
    a registration unit configured to register to the server a second message in association with the first message in response to a third message being registered and the determining unit having determined that the predetermined time has elapsed without the output unit having output the image data.

* * * * *